Figures 1, 2:
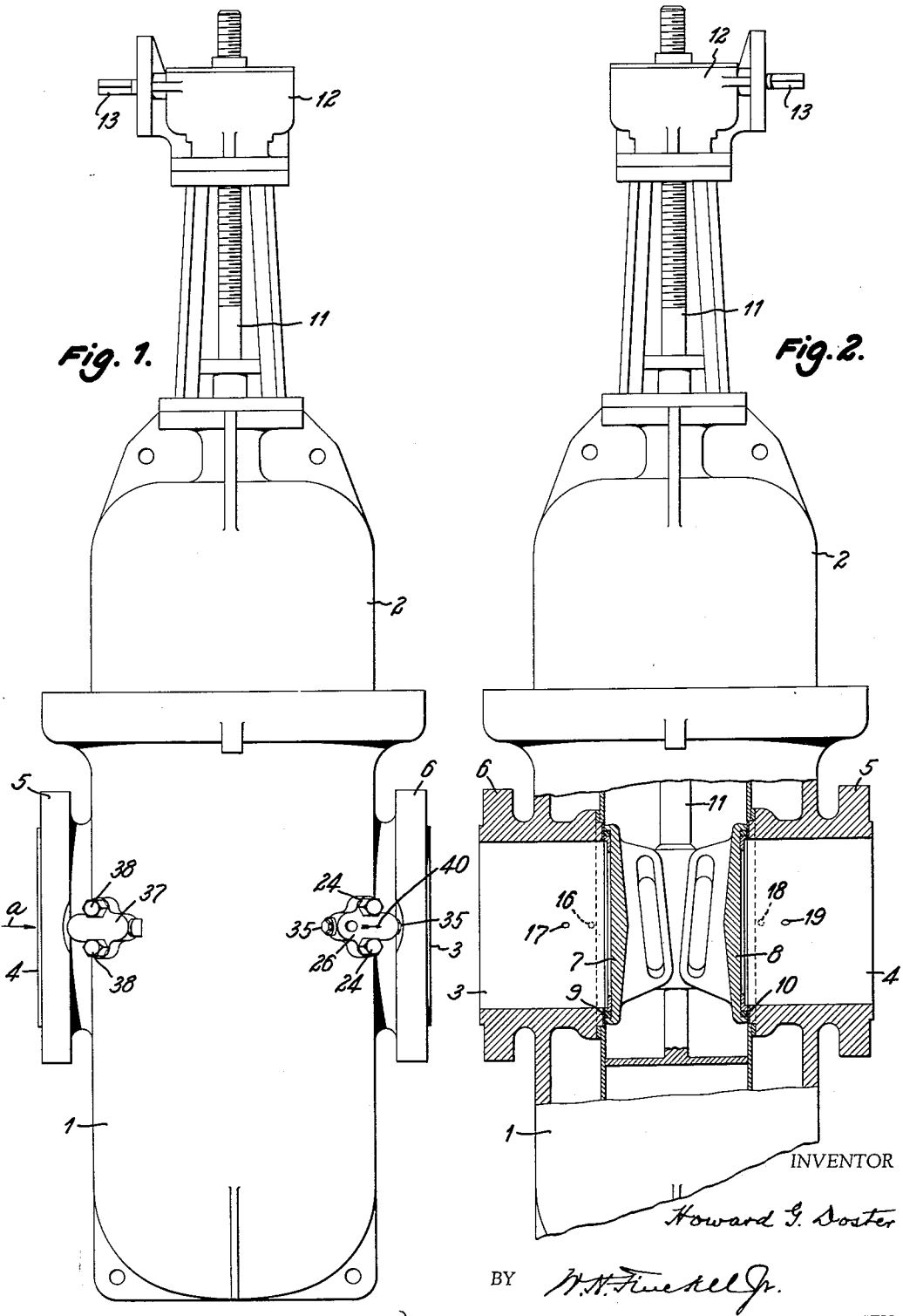

Dec. 13, 1955 H. G. DOSTER 2,726,672
BY-PASS MEANS FOR VALVES
Filed July 7, 1952 2 Sheets-Sheet 1

INVENTOR
Howard G. Doster
BY
ATTORNEY

Dec. 13, 1955    H. G. DOSTER    2,726,672
BY-PASS MEANS FOR VALVES
Filed July 7, 1952    2 Sheets-Sheet 2
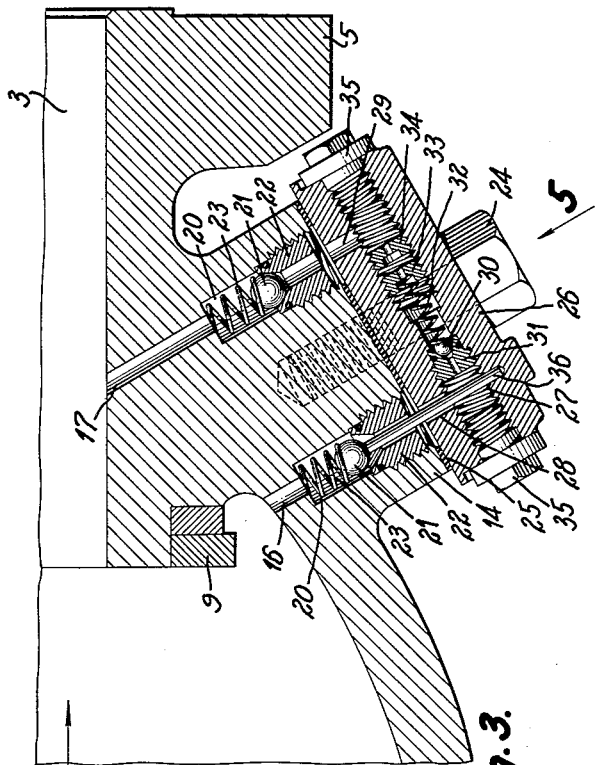
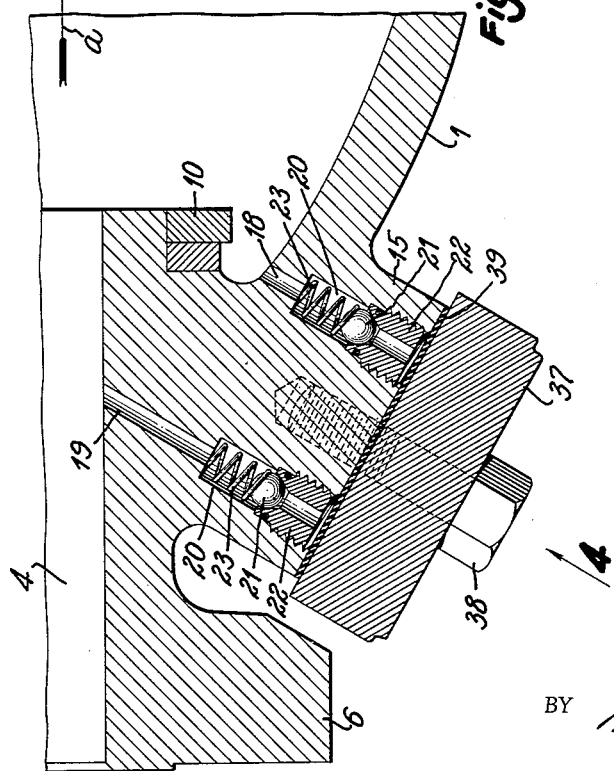
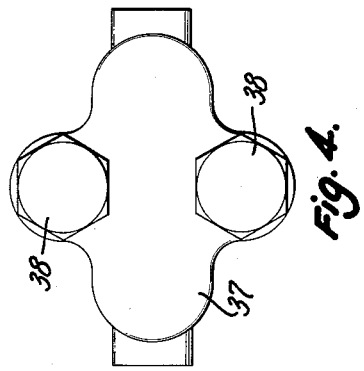
INVENTOR
Howard G. Doster
BY
ATTORNEY

United States Patent Office 2,726,672
Patented Dec. 13, 1955

2,726,672

BY-PASS MEANS FOR VALVES

Howard G. Doster, Wadsworth, Ohio, assignor to The Ohio Injector Company, Wadsworth, Ohio, a corporation of Ohio Application July 7, 1952, Serial No. 297,514

10 Claims. (Cl. 137—271)

This invention relates to valves, and it has particular reference to valves for use in installations such as exposed, or semi-exposed, pipe lines in which a build-up of pressure behind and/or in the body of a closed valve might tend to cause its failure; and the invention particularly residing in by-pass means which will serve, upon occurrence of undesired or dangerously high pressure within the valve body, to automatically relieve such pressure from the body to the pipe line.

As just intimated, and as is well recognized in the servicing and maintenance of pipe lines, particularly those extending in exposed or semi-exposed condition through arid regions, the heat of the sun and surrounding atmosphere to which closed valves are subjected often raises the pressure within the valves to a point critical with respect to that for which the valves are designed, and this may, and sometimes does, result in fracture or other failure of the valves.

The by-pass means of the invention is designed to obviate failure of valves due to the occurrence therein of abnormally high pressures by functioning to automatically pass the pressure fluid from the body around the closed or seated valve and into the pipe line, and although a primary functional purpose of the by-pass means of the invention is that of employment in pipe line valves, as just described, it will be understood that its use is not limited thereto and that it is susceptible of advantageous functioning in many other types of installations where somewhat similar pressure problems may arise.

The primary object of the invention is, therefore, to provide means for automatically and effectively relieving excessive pressure, or undesirable pressure, which may build up in valve bodies, by by-passing pressure fluid from the valve body to the pipe line or to atmosphere.

Another object is to provide means for so adjusting the by-pass means that it may function automatically upon occurrence of any predetermined pressure within the valve body.

A further object is to provide by-pass means of a type, and so arranged with respect to the operative parts of the valve, that it is capable of final assembly for effective functioning after installation of the valve in the pipe line in proper sense with respect to the direction of flow of fluid through or to the valve.

To these ends the invention comprises by-pass means including a pair of ducts penetrating a wall of the valve body adjacent to the valve seat and disc or closure member at a port thereof, one of said ducts having its inner terminus communicating with the valve body inwardly thereof with respect to such seat and disc, and the other duct having its inner terminus communicating with the body outwardly of such seat and disc, preferably with the port wall, and these ducts being provided with automatic spring loaded check valves seating outwardly. The outer termini of the ducts are spanned by a bridge member having a bore establishing communication between the ducts under control of an auxiliary check valve adjustably spring loaded, and it is provided with means for maintaining the check valve of the first mentioned duct in unseated condition in order that the said auxiliary check valve may always be subjected to pressure existing within the valve body. In reference to valves of the double seat and disc type, and which are capable of installation endwise in either of two directions, the pairs of ducts and their check valve means are duplicated in association with each of the seat and disc assemblies, one of such pairs being furnished with a bridge member of the type just referred to and which may be termed an activating bridge, and the other pair being closed or blocked by a non-activating or blank bridge member, the two bridge members being interchangeable to accommodate the valve to the direction of flow of fluid through it, all as will be explained hereinafter more fully and finally claimed, it being understood that the foregoing statement of the nature of the invention is of a somewhat more limited nature than as defined in certain of the claims in order that it may be more readily understood.

In the accompanying drawings illustrating the invention, in the several figures of which like parts are similarly designated, Fig. 1 is a side elevation of a gate valve with the by-pass means of the invention applied thereto, Fig. 2 is a fragmentary side elevation and partial section of the valve shown in Fig. 1 turned through 180° upon its vertical axis, the disc or closure means and actuating means therefor being shown in somewhat conventionalized form, Fig. 3 is a greatly enlarged fragmentary transverse section of the valve body of Fig. 1, taken in a plane passing through the axis of the valve ports and the by-pass means associated therewith, Fig. 4 is a face view of the non-activating or blank bridge member of the by-pass means at the left of the valve body viewed in the direction of the arrow 4 of Fig. 3, and Fig. 5 is a similar view of the activating bridge member at the right of the valve body viewed in the direction of the arrow 5 of Fig. 3.

The valve shown, which is of the double seat and disc gate valve type, includes the body 1 and bonnet 2, and the body is provided with ports 3 and 4 having the usual surrounding bolting flanges 5 and 6, respectively, for connection in a pipe line, not shown. As illustrated particularly in Fig. 2, in more or less conventionalized form, the valve has a pair of similar discs or closure members 7 and 8 cooperating with seats 9 and 10 of the ports 3 and 4, respectively, and these discs are slidingly actuated to simultaneously open and close the ports 3 and 4 by means of a stem 11 and operating gearing, not shown, housed in a casing 12 and controlled by a shaft 13 to which a crank or handwheel or motor drive, not shown, may be applied. The actuating means shown are of the rising stem type, but it will be understood that they might be of non-rising stem or other type.

Having reference particularly to Figs. 1 and 3, it will be seen that the valve body 1 is provided, in line with a transverse plane passing through the axis of the valve ports 3 and 4, with bosses 14 and 15, respectively, each of which serves for location of the by-pass means of the invention which include pairs of ducts 16, 17 and 18, 19, respectively, all of which ducts are provided with similar counterbores 20 for the reception and housing of similar automatic check valves including valve balls 21 outwardly seating upon seat members 22 and spring loaded by springs 23. By means of these check valves fluid under pressure in the valve body and in the pipe line connected therewith is prevented from escaping to atmosphere.

Assuming that the valve is so installed in the pipe line that the direction of flow of fluid is in the direction of the arrows a, Figs. 1 and 3, venting or relief of undesired pressure within the body 1 and bonnet 2 will preferably be accomplished by by-passing pressure fluid from the body and bonnet around the closed disc 7 and seat 9 to the port 3. For this purpose there is attached by bolts 24 to the boss 14, preferably with an interposed gasket 25, an activating bridge member 26 having a through bore 27 communicating through lateral bores 28 and 29 with the ducts 16 and 17, respectively, and provided intermediate these lateral bores with an automatic check valve comprising a ball 30, seat member 31 and loading spring 32 the effect of which may be varied, in order to vary the response of the check valve to pressure in the valve body, by an adjustable bearing nut 33 screwthreaded into the bore 27 and which may be backed up by a lock nut 34. The outer, non-functioning ends of the bore 27 are sealed by screw plugs 35. Rigidly seated in the bridge member 26 and extending inwardly through the lateral bore 28 thereof is a trip rod 36 which serves to unseat the ball 21 of the check valve in the inner duct 16 to thus afford open communication between the valve body and bonnet with the bore 27 of the bridge member 26. Obviously, if pressure established in the body and bonnet is sufficient to unseat the check valves in the bore 27 and duct 17 a by-pass of pressure fluid through duct 16, bores 28, 27 and 29, and duct 17 to the port 3 and thence to the pipe line will occur.

With this arrangement of parts, and their functioning as described, it will be apparent that the ducts 18 and 19 associated with the other discs and seat 8—10 will be inoperative. Hence these ducts may be blocked off by a non-activating bridge member 37, Figs. 1, 3 and 4, secured to the boss 15 by bolts 38 with an interposed gasket 39. It will be noted that the activating and non-activating bridge members 26 and 37 are similar in general conformation, but the activating bridge member 26 is marked by an arrow 40 which not only serves to distinguish the bridge members from each other but indicates also the sense in which the activating bridge member should be installed on the valve body.

Furthermore, the detailed appearance of the activating bridge member 26, as well as its applied arrow 40, indicates in which way, port for port, the valve should be installed in a pipe line as regards the direction of flow of fluid through such line.

Should a valve be improperly installed with relation to the flow of fluid through the pipe line, the activating and non-activating bridge members may simply be interchanged. To facilitate such interchange and, moreover, to make it possible without loss of fluid while the line and valve are under pressure, it is preferred to have check valve assemblies installed in all of the ducts 16, 17, 18 and 19. It would be practical, however, insofar as proper functioning for an established installation is concerned, to omit the check valve assemblies from the ducts blocked off by the non-activating bridge member. Also, assuming that the check valve 30—31—32—33 in the bore 27 of the activating bridge member 26 were so designed as to be capable of proper functioning in the presence of pressure from the valve body in such bore, then the check valve assembly in the duct 17 could also be omitted.

The combination of the by-pass means of the invention with a valve of a particular type as shown and described, is not to be understood as a measure of its adaptability, it being obvious that it is susceptible of connection or combination with any type of valve in the use of which conditions that the by-pass means will cure may develop.

Various changes and modifications are considered to be within the principle of the invention and the scope of the following claims.

What I claim is:

1. By-pass means for valves, including, in combination with a valve body provided with a flow port for connection with a conduit and valve seat and closure members for said port, of a pair of ducts penetrating a wall of the body and having their inner and outer termini at the interior and exterior of the wall of said body, respectively, the inner terminus of one of said ducts communicating with the interior of the body inwardly of said seat with respect to said conduit and the inner terminus of the other of said ducts communicating with the flow port outwardly of said seat and in communication with said conduit, each of said ducts provided with a check valve and means for normally biasing said check valve toward the outer terminus of its duct to seated condition, a bridge member spanning said ducts at their said outer termini and provided with a bore affording communication between said ducts, and means carried by said bridge member for positively unseating the check valve means of the duct having its inner terminus arranged inwardly of said seat, whereby undesired pressure within said body may be by-passed around such seat and its closure member.

2. By-pass means as claimed in claim 1, in which the bore of said bridge member is provided with an automatic check valve which must be unseated by the pressure within said body in order that by-passing thereof may be established.

3. By-pass means as claimed in claim 2, in which the check valve in the bore of said bridge member is spring loaded, and means are provided for varying such spring loading, thereby to predetermine the undesired pressure within the valve body at which said by-pass means will become effective.

4. By-pass means as claimed in claim 1, in which spring loading means are provided for the check valve means of at least the said duct having its inner terminus communicating with the flow port outwardly of said seat whereby undesired pressure within said body must be sufficient to overcome such loading in order for the by-pass means to function.

5. By-pass means as claimed in claim 4, in which the bore of said bridge member is provided with an automatic spring loaded check valve, whereby in order for said by-pass means to function the undesired pressure within said body must be sufficient to overcome the spring loading of both of said check valves.

6. By-pass means as claimed in claim 5, in which means are provided for varying the spring loading of the check valve in the bore of said bridge member, thereby to predetermine the undesired pressure within the body at which said by-pass means will become effective.

7. By-pass means as claimed in claim 1, in which the check valve means of both of said ducts are spring loaded, and the unseating means of said bridge member functions to unseat its respective check valve means against the spring loading thereof.

8. By-pass means for valves, including, in combination with a valve body provided with a pair of flow ports and complemental seat and closure members for both of said ports, of a pair of ducts penetrating a wall of the body in an arrangement of similar nature adjacent to each of said ports and characterized in that the inner terminus of one of said ducts communicates with the interior of the valve body inwardly of its respective port seat and the inner terminus of the other of said ducts communicates with the flow port outwardly of said respective seat, automatic outwardly seating check valve means in each of the ducts of one of said pairs of ducts, an activating bridge member spanning said valve controlled ducts at their outer termini and provided with a bore affording communication between said ducts, means carried by said bridge member for positively unseating the check valve means of the duct having its terminus arranged inwardly of the respective port seat, whereby undesired pressure within said body may be by-passed around such seat and its closure member, and a non-activating bridge member spanning the outer termini of the other pair of ducts and serving to interrupt communication therebetween.

9. By-pass means as claimed in claim 8, in which the ducts of the other pair thereof also are both provided with automatic outwardly seating check valve means, and said activating and non-activating bridge members are relatively interchangeable to thereby adapt the valve body for installation in a pipe line regardless of the direction of flow of fluid therethrough and for adjustment of the by-pass means in accommodation to the flow of fluid through the valve subsequent to such installation.

10. By-pass means as claimed in claim 9, in which the check valve means of all of said ducts are spring loaded to insure their seating under pressure within the valve and pipe line, thus to guard against leakage through said ducts when interchange of said activating and non-activating bridge members is made while said line and valve are under pressure of fluid in the line.

References Cited in the file of this patent

UNITED STATES PATENTS

| | | |
|---|---|---|
| 607,252 | Luken | July 12, 1891 |
| 1,936,873 | Glab | Nov. 28, 1933 |
| 2,200,824 | Herman | May 14, 1940 |
| 2,335,923 | Dube | Dec. 7, 1943 |
| 2,590,679 | Callahan | Mar. 25, 1952 |